(12) United States Patent
Shashurin et al.

(10) Patent No.: US 12,358,652 B2
(45) Date of Patent: Jul. 15, 2025

(54) DUAL-MODE ELECTRICAL AND CHEMICAL PROPULSION SYSTEM FOR SMALL SPACECRAFT AND CUBESATS

(71) Applicant: Purdue Research Foundation, West Lafayette, IN (US)

(72) Inventors: Alexey Shashurin, West Lafayette, IN (US); Timothee Louis Pourpoint, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 7 days.

(21) Appl. No.: 18/491,511

(22) Filed: Oct. 20, 2023

(65) Prior Publication Data

US 2024/0132232 A1  Apr. 25, 2024
US 2024/0228066 A9  Jul. 11, 2024

Related U.S. Application Data

(60) Provisional application No. 63/421,167, filed on Oct. 31, 2022, provisional application No. 63/418,075, filed on Oct. 21, 2022.

(51) Int. Cl.
*B64G 1/40* (2006.01)

(52) U.S. Cl.
CPC ......... *B64G 1/413* (2023.08); *B64G 1/4026* (2023.08)

(58) Field of Classification Search
CPC ....... B64G 1/4026; B64G 1/405; B64G 1/413
See application file for complete search history.

(56) References Cited

U.S. PATENT DOCUMENTS 10,023,328 B2 *  7/2018  Zurbach .................... F02K 9/76
2020/0407084 A1 * 12/2020  Shashurin ............. F03H 1/0087

FOREIGN PATENT DOCUMENTS

CN         115142983 A  * 10/2022  ............. B64G 1/401

OTHER PUBLICATIONS

Merged document of CN115142983A (Year: 2022).*

* cited by examiner

*Primary Examiner* — Nicholas McFall
(74) *Attorney, Agent, or Firm* — Kevin R. Erdman; Brannon Sowers & Cracraft PC

(57) ABSTRACT

Dual mode engine for propelling spacecraft, including combustion chamber having flange end, open nozzle end, and enclosed chamber portion extending therebetween, propellant tank in fluidic communication with combustion chamber, electronic controller, power source operationally connected to electronic controller, and fluid flow motivator operationally connected to electronic controller and connected in fluidic communication with propellant tank. Engine has chemical propulsion portion with propellant inlet port operationally connected to combustion chamber and disposed adjacent flange end, ignition trigger electrode positioned in combustion chamber adjacent propellant inlet port and operationally connected to electronic controller and operationally connected to power source propellant inlet port fluidically connected to tank electric propulsion portion with two electrodes ionizing propellant positioned in combustion chamber adjacent nozzle end, plurality of attitude control thrusters operationally connected to electronic controller and in fluidic communication with propellant tank, and plurality of valves, each fluidically connected between attitude control thruster and propellant tank.

18 Claims, 12 Drawing Sheets

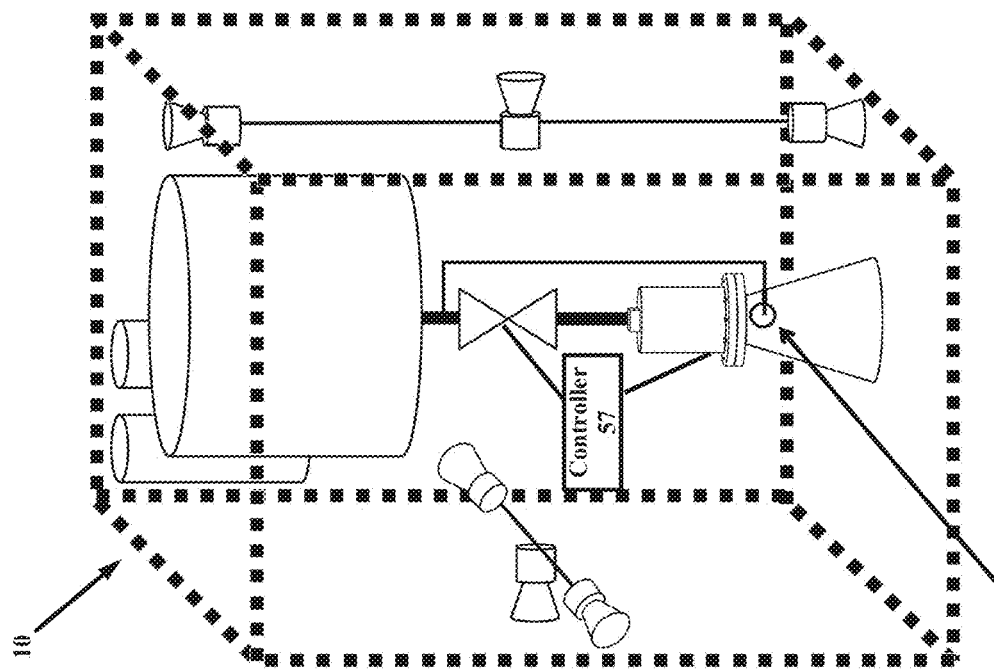

DUAL-MODE ELECTRICAL AND CHEMICAL PROPULSION SYSTEM FOR SMALL SPACECRAFT AND CUBESATS

CROSS-REFERENCE TO RELATED APPLICATIONS

This patent application claims priority to U.S. 63/418,075, filed on Oct. 21, 2022, and to U.S. 63/421,167, filed on Oct. 31, 2022, both of which are incorporated herein by reference.

TECHNICAL FIELD

The invention relates generally to the field of propulsion and, specifically, to a dual electrical and chemical propulsion system for satellites, and method of using the same.

BACKGROUND

The Small Spacecraft Technology Program at NASA is supporting development of small spacecraft-related technologies that can be applied in future NASA scientific and exploratory missions. In particular, the program is focused on CubeSat-scale small spacecrafts and their utilization in lunar missions, wherein cubesats are miniaturized satellites characterized by a cubic shape and a with a form factor of 10 cm (3.9 in). CubeSats typically have a mass of no more than 2 kg (4.4 lb) per unit.

One aspect of the program is development of robust green propulsion systems allowing long-lasting operation, such as in lunar orbits. Current focus is on design of chemical monopropellant thrusters operating with "green" propellants at thrust level T<22 N and specific impulse $I_{sp} \approx 210$-230 s, as detailed in NASA Green Propulsion Technologies Development Roadmap and illustrated in FIG. 1.

The best developed of these prior art propulsion technologies is limited to relatively low $I_{sp} \approx 210$-230 s. This creates a technology gap which limits achievable missions' $\Delta V$ (change in velocity) and shortens overall operational time of the small spacecraft.

It is well known that chemical propulsion (CP) systems are characterized by high values of thrust, although they suffer from low specific impulse $I_{sp}$ and limited $\Delta V$ values. In contrast, prior art electric propulsion (EP) systems can reach outstandingly high $I_{sp}$ and $\Delta V$ characteristics, but thrust level is low due to the limited power budget available on the spacecraft. Thus, there remains a need for an improved satellite propulsion system. The present novel technology addresses this need.

SUMMARY

This invention relates to a dual-mode CP and EP system for propelling small and cubesat scale spacecraft capable of operating in two modes: high-thrust CP mode (e.g., for quick maneuvers, orbit changes) and high-$I_{sp}$ EP mode (e.g., for long-duration station-keeping).

The dual-mode CP and EP system utilizes a common set of hardware and the same propellant for both modes such that the total system size and mass is less than that of individual CP and EP engines combined. Operationally, the use of a common set of hardware means that the dual-mode system can be switched at will between CP and EP modes, allowing generation of high thrust when the CP system is used and achieving high $I_{sp}$ and $\Delta V$ when the EP system is used.

BRIEF DESCRIPTION OF THE DRAWINGS

FIG. 5A-5C are schematic views of the engine of FIG. 3.

DETAILED DESCRIPTION OF THE PREFERRED EMBODIMENTS

Figure 1:
FIG. 1 graphically illustrates NASA's agenda for developing green propellant engines.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the claimed technology as illustrated therein being contemplated as would normally occur to one skilled in the art to which the claimed technology relates.

FIGS. 2-5C illustrate a first embodiment of the present novel technology, a dual-mode CP/EP (chemical propulsion/electric propulsion) system 10 for small and cubesat scale spacecraft. The system or apparatus 10 is capable of operating in two modes: high-thrust CP mode and high-$I_{sp}$ EP mode. The system includes a primary thrust engine apparatus 13, which defines a flanged or otherwise closed end 15, an open end 20, and a frustoconical or bell shaped endless wall portion 25 extending therebetween. The engine 13 further includes an inlet port 30 and a propellant feed tube 35 operationally connected to the inlet port 30 and to propellant tank 40, typically through check valve 45. The engine 13 further includes a trigger electrode 50 positioned within engine 13 and disposed adjacent inlet port 30. The engine 13 further includes one or more, typically a plurality, of electrodes 43 positioned adjacent open end 20 and disposed within the engine 13, typically with a bypass valve 47. Electrodes 43 and/or 50 may be an ignition trigger electrode.

The system 10 typically includes one or more, typically a plurality of smaller attitude control thrusters 51, each respective thruster 51 operationally connected to the propellant tank 40, more typically through respective check valves 55 positioned in line between the tank 40 and the respective thruster 51.

In some embodiments, a pressure tank 60 is connected in hydraulic or pneumatic communication with the propellant tank 40, typically through check valve 65.

In some embodiments, a catalyst/combustion chamber 70 is operationally connected to flange end 15 in fluidic communication with the chamber defined by endless wall 25.

The dual-mode CP and EP system 10 utilizes a common set of hardware 15, 20, 25, 50, 55 and the same propellant from the same tank 40 for both modes such that the total system size and mass is less than that of individual CP and EP engines combined. Tank 40 is typically operationally connected to pump 49 for urging propellant into the engine portion 13 for CP and/or EP operation. Operationally, the use of a common set of hardware means that the dual-mode system 10 can be switched at will between CP and EP modes, allowing generation of high thrust when the CP mode is used and achieving high $I_{sp}$ and $\Delta V$ when the EP mode is used.

In most embodiments, an electronic controller 57 is operationally connected to the pump 49, the ignition electrodes 43, 50, and the valves 45, 55. In some embodiments, sensors (not shown) may likewise be disposed in or about the system 10 and operationally connected to electronic controller 57.

Example: Dual-Mode System for Hypothetical Mission

A principal benefit of the dual-mode propulsion system 10 can be illustrated in the following analysis of a hypothetical mission requiring a propulsion system capable of generating thrust up to 1 N and reaching overall mission $\Delta V>2$ km/s on a 12 U/12 kg CubeSat, wherein U is a volumetric unit equally about 12.75 liters. The analysis shows that a dual-mode system 10 allows about a twofold savings in size and mass of the system 10 in comparison with a simple combination of two commercially available systems of similar size, as detailed below.

The mission requirements can be met by two state-of-the-art propulsion systems: MPS-120 Monoprop (size—2 U, wet mass—2.4 kg) and BIT-3 RF Ion thruster (size—1.6 U, wet mass—2.9 kg). Note that these specific propulsion systems are chosen due to their commercial availability, well-documented specs, and relevance to the size of the 12 U/12 kg spacecraft. These systems are not necessarily used in this invention and are presented here to demonstrate conceptual benefits of the dual-mode approach.

Figure 2:
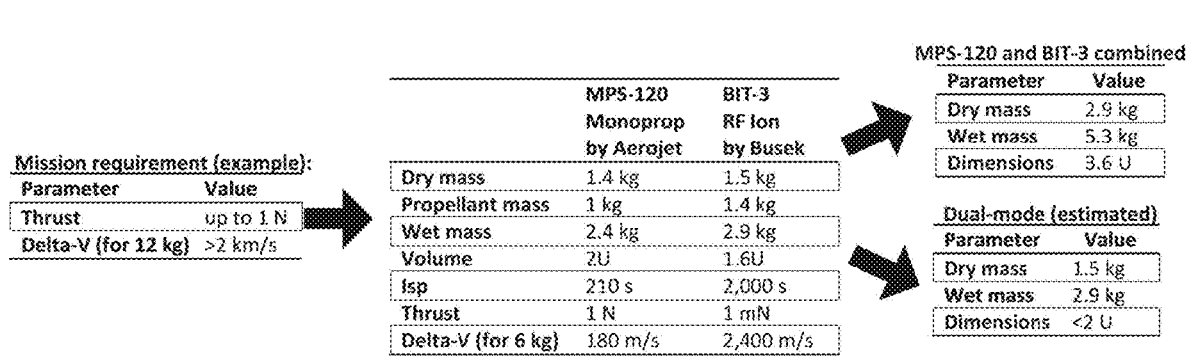
FIG. 2 graphically illustrates a hypothetical mission requiring T=1 N and reach $\Delta V$>2 km/s on 12 U/12 kg spacecraft according to a first embodiment of the present novel technology.
Figure 3:
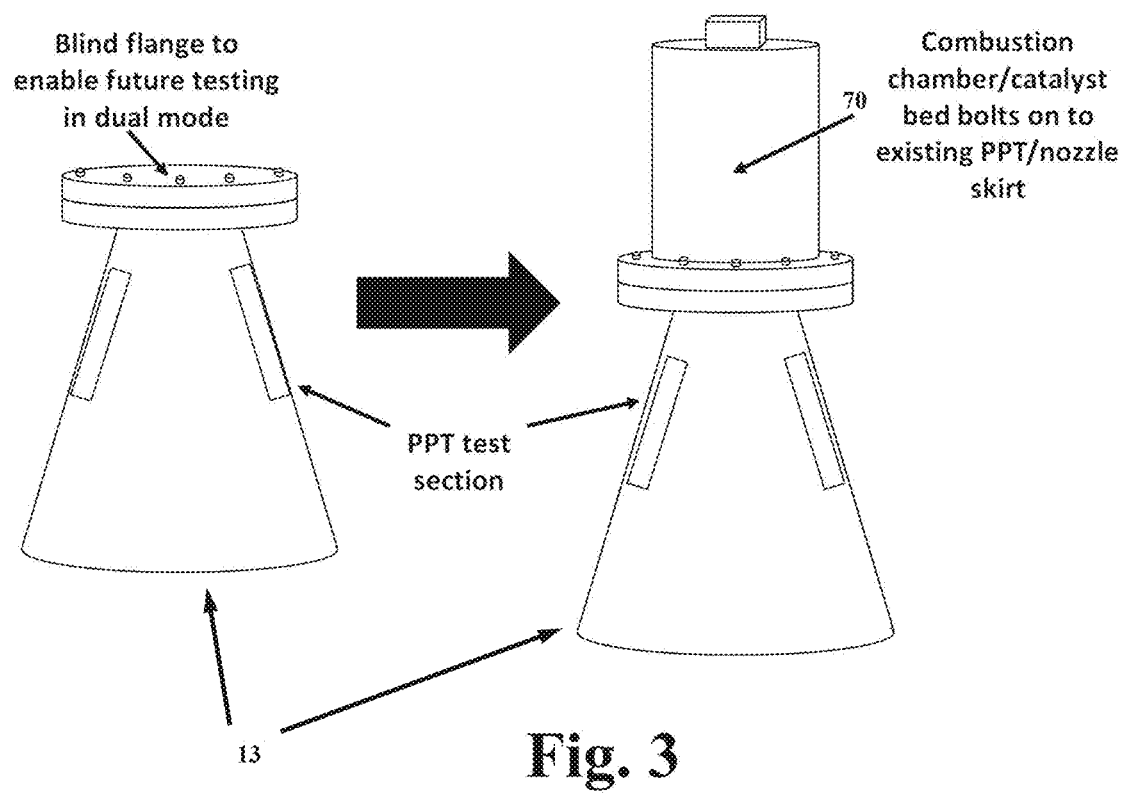
FIG. 3 is a perspective view of a first embodiment dual CP/EP engine.

FIG. 2 illustrates and contrasts performance of both systems. One can see that the CP system can reach thrust values of up to 1 N, while limited by maximal $\Delta V$ of 180 m/s. On the contrary, the EP system can reach an outstanding $\Delta V$ of 2.4 km/s, but the thrust level is low at about 1 mN.

The prior art solution would require carrying both EP and CP on board the CubeSat. This scenario would require a 5.3 kg mass and 3.6 U volume propulsion system, as shown in FIG. 2. In contrast, a dual-mode propulsion system 10 that utilizes a common set of hardware and the same propellant for both modes can potentially achieve mission requirements with a propulsion system with volume <2 U and mass <3 kg (see FIG. 2).

The dual-mode system combines 10 a monopropellant engine 13 as the CP system and a Liquid-Fed Pulsed Plasma Thruster (LF-PPT) as the EP system, as illustrated in FIGS. 3-5C. The system 10 utilizes a common set of hardware and the same liquid propellant. Liquid propellants such as "green" propellant AF-M315E or the like may fill tank 40. Some parameters that characterize performance of the dual-mode system 10 include specific impulse $I_{sp}$, thrust T for each operation mode, and efficiency $\eta$ of electric energy conversion to thrust (for EP mode only).

Figure 4A:
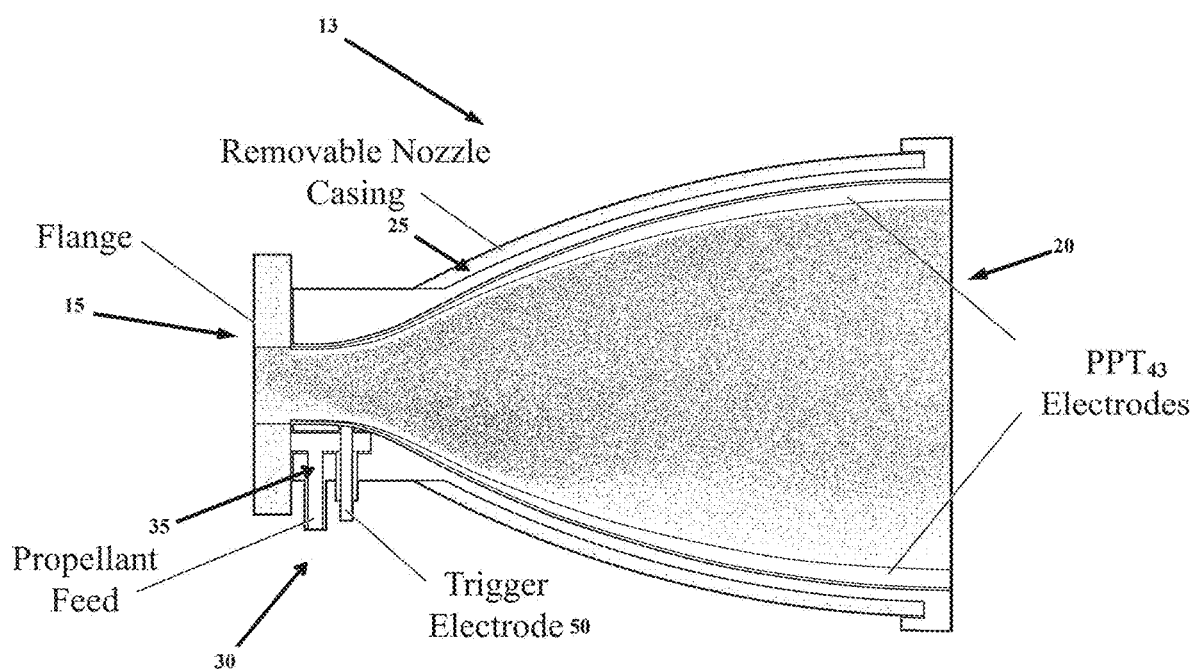
FIG. 4A is a cutaway plan view of the engine of FIG. 3.
Figure 4B:
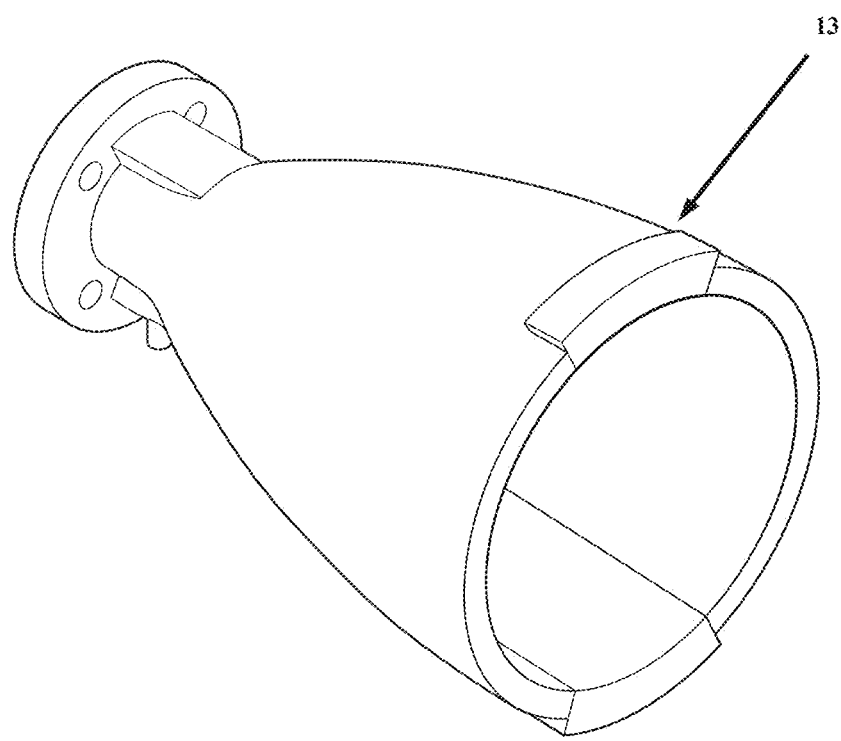
FIG. 4B is a perspective view of the engine of FIG. 3.

FIGS. 4A and 4B illustrate the modification of the nozzle section 13 of the monopropellant thruster to include the PPT electrodes 43. The nozzle casing 25 defines a combustion chamber and mimics the shape of the original monopropellant thruster nozzle and can be fabricated from boron nitride (BN), alumina ($Al_2O_3$), and other refractory ceramics, refractory metals, refractory cermets, composite materials, and the like. Custom-made electrodes 43 for the LF-PPT plasma thruster are embedded in the nozzle's body, as shown in FIGS. 4A and 4B. Iridium-coated rhenium and Inconel alloys may be used for the PPT electrode material. The electrodes of the PPT 43 are flush-mounted with the inner nozzle 25 profile. Trigger electrode 50 of LESF is typically installed near a grounded PPT electrode 43, and the interelectrode space between the two will be filled with propellant fed from the tank 40. All electrodes are operationally connected to power source 59.

Figures 5A, 5B:
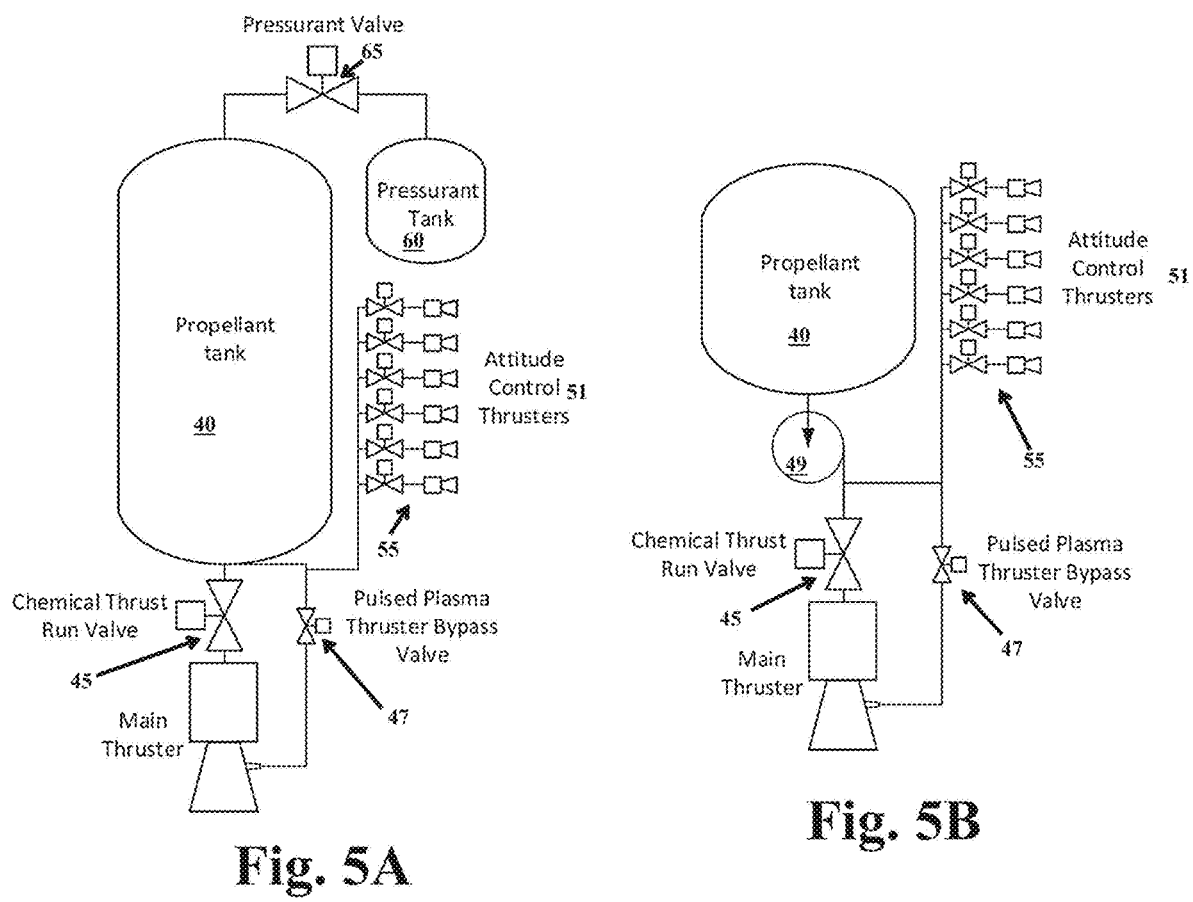

The schematics of the propellant feeding subsystem and integration in CubeSat are shown in FIGS. 5A-5C.

As used herein, the pressurized tank 60 and the pump 49 may be considered fluid flow motivators.

One application of the dual-mode propulsion system 10 accommodates propelling CubeSats from lunar orbits to either the Gateway or the International Space Station. Specifically, one scenario of the dual-mode application refers to trajectory corrections in orbit around the moon. To illustrate this, it is useful to consider operational constrains of the current NASA Lunar Flashlight (LF) mission. In the LF mission, slight orbital corrections (to compensate for the solar drag, orbital precession, etc.) are performed on each pass for better targeting. This is currently achieved by changing orientation, performing the burn, and then reorienting to the mission operation configuration each time. This in turn results in changes of solar array orientation and reduction of solar energy harvesting and acquiring additional $\Delta V$. Dual-mode operation assists in minimizing these types of operational constraints by utilizing high-$I_{sp}$ EP mode for these orbital corrections associated with lower energy and propellant cost.

Another application of the dual-mode system refers to utilization in low altitude earth orbits where drag make-up is important. Cubesat missions are a good fit for these applications. CP mode could be used to get to the correct orbit quickly and EP mode for continuous thrust to negate drag.

Example

Figure 6A:
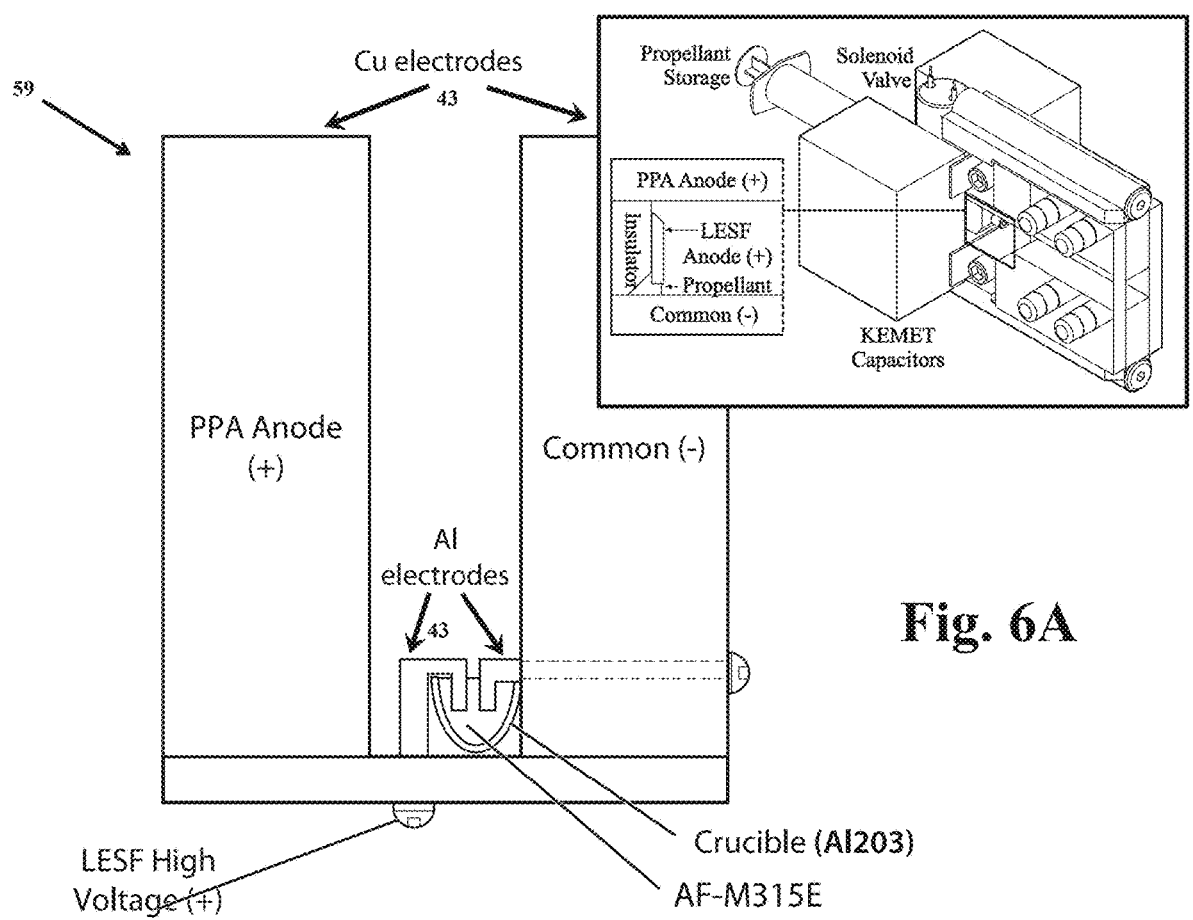
FIGS. 6A and 6B schematically illustrate the liquid-fed pulsed plasma thrust more of operation of the engine of FIG. 3.
Figure 6B:
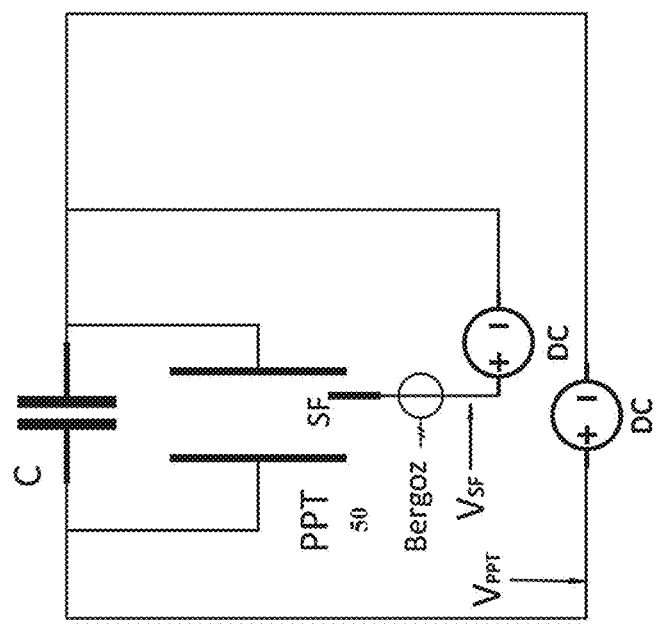

A liquid-fed pulsed plasma thruster (LF-PPT) was operated with AF-M315E liquid propellant. The LF-PPT consists of a pulsed plasma accelerator (PPA) portion and a Low-Energy Surface Flashover (LESF) igniter 50, as shown in FIG. 6A-B The PPA was formed by a pair of oxygen-free high thermal conductivity copper electrodes 43 in a parallel-plate configuration for ionizing the propellant. Electrode spacing and width were both measured at 1.27 cm, with an accelerating channel length of 6.5 cm. The LESF igniter was formed by one of the PPA electrodes and an additional electrode placed between the thruster rails. AF-M315E propellant was filled in an alumina crucible clamped between two aluminum electrodes.

The electrical schematic of the thruster is outlined in FIG. 6B. The PPA electrodes were connected to a 3 µF capacitor bank formed by two 1.5 µF and 2 kV nonpolar polypropylene capacitors connected in parallel. The capacitor bank was charged to about 800 V using a 225-210-05R high voltage source. A current monitor and voltage probe were used to measure voltage and current waveforms.

Figure 7A:
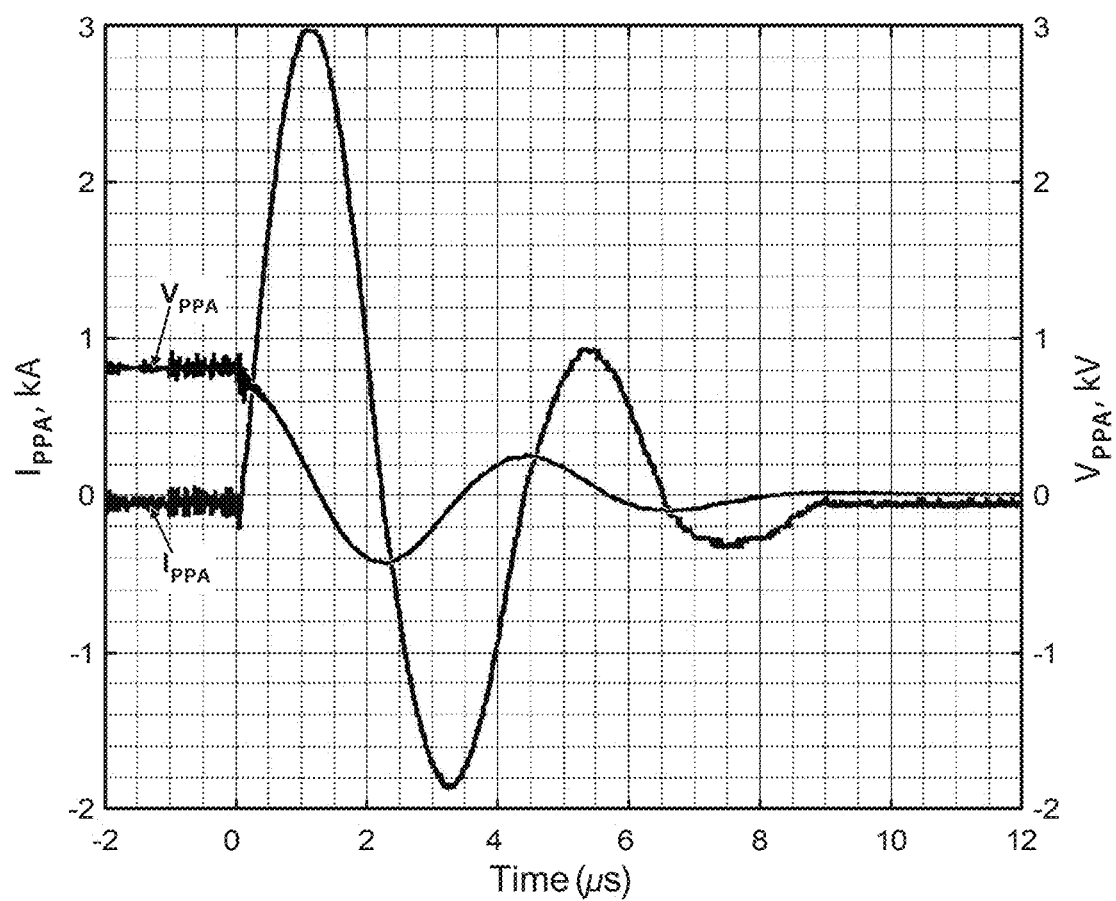
FIG. 7A illustrates the V-I relationship for the engine of FIG. 3
Figure 7B:
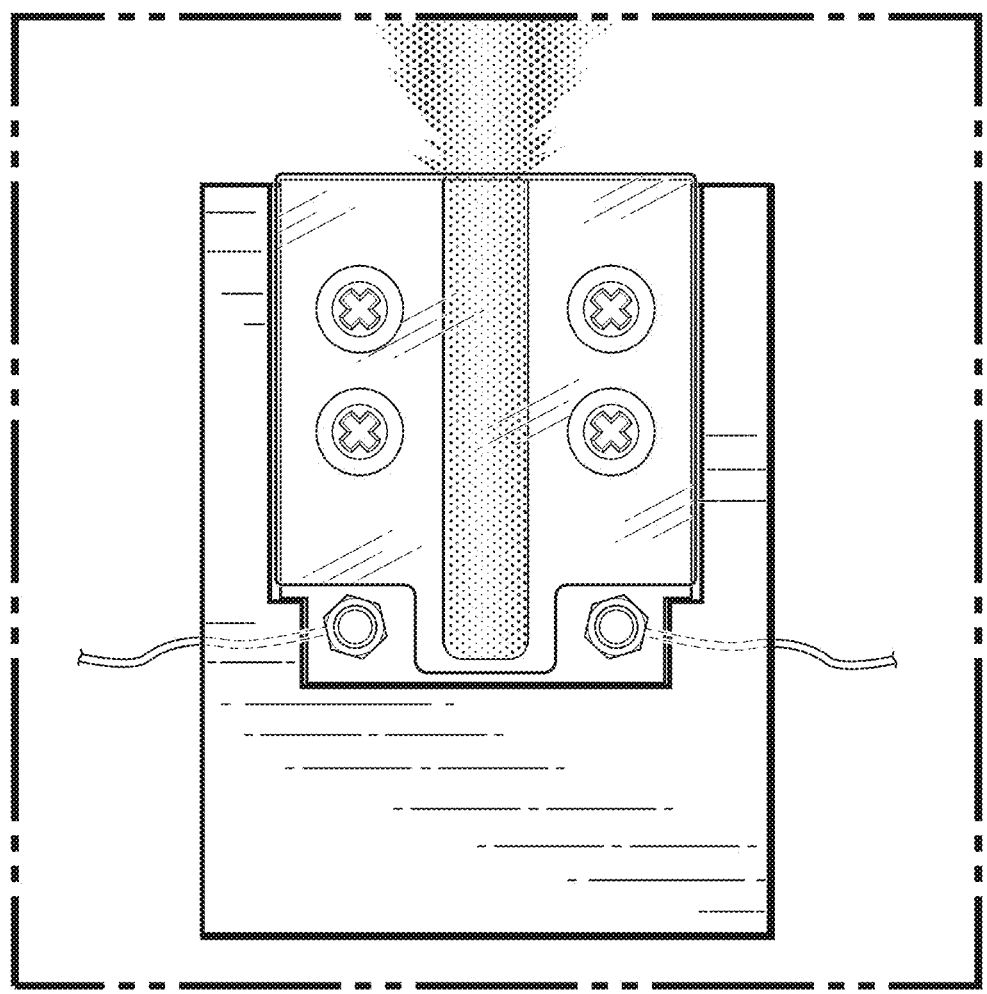
FIG. 7B is an image of LF-PPT firing of the engine of FIG. 3.
Figure 8:
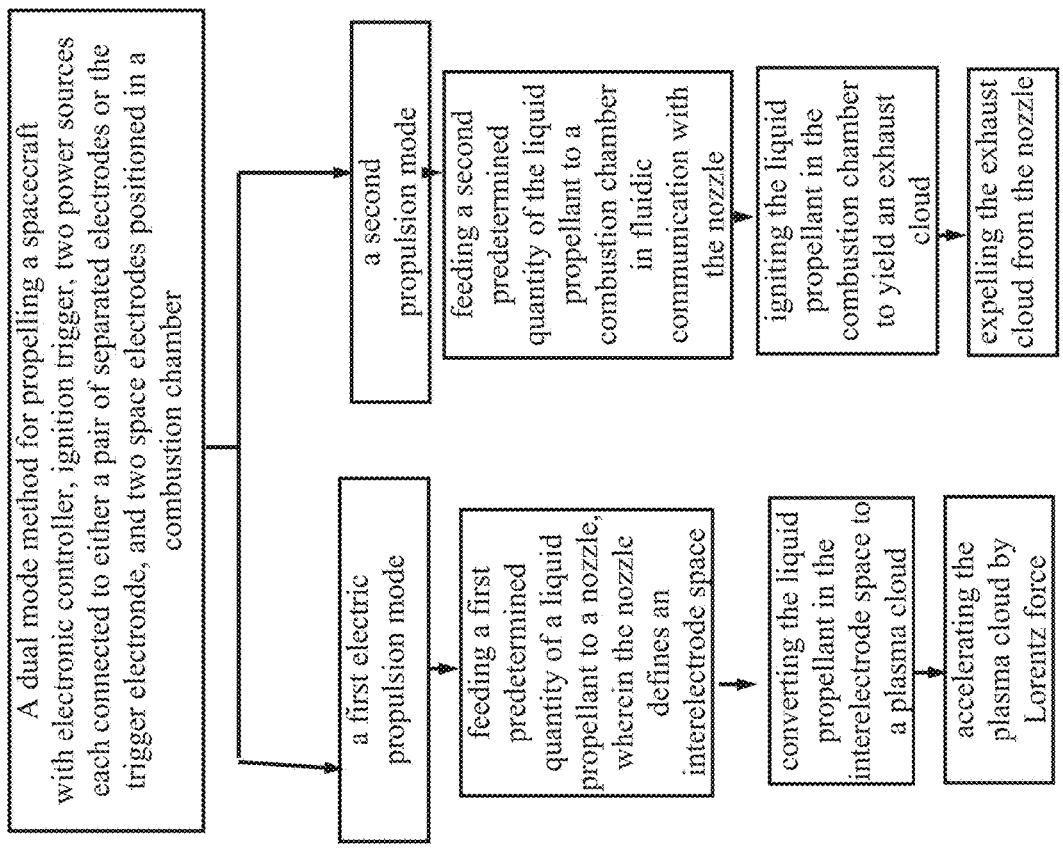
FIG. 8 is a flow chart illustrating the method of Claim 4.

The successful ignition of AF-M315E was observed, followed by voltage pulse application. Voltage and current waveforms of the PPA are presented in FIGS. 5A-5C along with visual camera observation (see FIG. 7B). The capacitor voltage ($V_{PPA}$) dropped from an initial value of 0.8 kV, and arc current ($I_{PPA}$) rose to a peak of 3 kA. The decaying oscillations of current and voltage indicate operation of the thruster in the underdamped LCR regime. Energy deposited in the PPA discharge was about 1 J in this experimental run. The image of the PPA assembly in FIG. 7(b) clearly indicates that PPA discharge, initiated by spark at the bottom of the channel, propagated through the entire length of the PPA electrodes and formed a visible plasma jet (or plasma cloud or exhaust cloud) at the thruster exhaust. Importantly, PPA was successfully reignited without the propellant reloading about 100 times, which indicates that a single thruster pulse did not cause the detonation of the entire amount of AF-M315E propellant stored in the crucible.

This demonstration clearly indicates that a pulse plasma thruster can be operated with liquid propellant AF-M315E. More specifically, the propellant can be ignited by electric spark; the ignition is local and does not cause detonation of the entire exposed propellant; the ionized propellant can be accelerated by the Lorentz body force and exhausted from the thruster in the form of a plasma jet or plasma cloud.

Dual-mode propulsion system is currently at technology readiness level (TRL) 4 (sitting between proof of feasibility research and technology development), as each component of the dual-mode system can be assessed as TRL>4 (technology development and technology demonstration). Specifically, monopropellant thrusters operating with hydrazine are TRL 9 (technology launch and operations), since these systems have been proven through multiple successful mission operations. Monopropellant thrusters operating with "green" propellants (AF-M315E and LMP-103S) are currently TRL 5-9 (technology development, demonstration, and implementation). Teflon-based pulsed plasma thrusters are TRL 7 (technology development) (TEFLON is a registered trademark of E.I. DU PONT DE NEMOURS AND COMPANY CORPORATION DELAWARE 1007 Market Street WILMINGTON DELAWARE 19898, registration nos. 71479666, 72049914 and relating to polymer sheets made from fluoridated hydrocarbons). Operation of a pulsed plasma thruster with AF-M315E propellant has been validated in the laboratory environment and its TRL can be assessed as level 4.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

We claim:

1. A dual mode method for propelling a spacecraft, the method comprising:
   a first electric propulsion mode, further comprising:
   a) feeding a first predetermined quantity of a liquid propellant to a nozzle, wherein the nozzle defines an interelectrode space;
   b) converting the liquid propellant in the interelectrode space to a plasma cloud; and
   c) accelerating the plasma cloud by Lorentz force; and
   a second propulsion mode, further comprising:
   d) feeding a second predetermined quantity of the liquid propellant to a combustion chamber in fluidic communication with the nozzle;
   e) igniting the liquid propellant in the combustion chamber to yield an exhaust cloud; and
   f) expelling the exhaust cloud from the nozzle.

2. The dual mode method for propelling a spacecraft of claim 1, wherein step b) further comprises:
   b1) vaporizing the liquid propellant in the interelectrode space; and
   b2) ionizing the liquid propellant in the interelectrode space.

3. The dual mode method for propelling a spacecraft of claim 1, wherein the liquid propellant is selected from the group consisting of AF-M315E, LMP-103S, hydrazine, and combinations thereof.

4. A dual mode thruster nozzle system for propelling a spacecraft, the dual mode thruster nozzle system comprising:
   a nozzle;
   a pair of separated electrodes positioned in the nozzle and defining an ignition space therebetween;
   a combustion chamber in fluidic communication with the nozzle;
   a trigger electrode operationally connected to the combustion chamber;
   a power source operationally connected to the pair of separated electrodes;
   a power source operationally connected to the trigger electrode;
   a liquid propellant reservoir in fluidic communication with the ignition space;
   a liquid propellant reservoir in fluidic communication with the combustion chamber;
   a fluid flow motivator connected in fluidic communication with the reservoir, the combustion chamber, and the ignition space; and
   an electronic controller operationally corrected to the power source, to the respective electrodes, and to and to the fluid flow motivator.

5. The dual mode thruster nozzle system for propelling a spacecraft of claim 4 wherein the nozzle is a ceramic.

6. The dual mode thruster nozzle system for propelling a spacecraft of claim 5 wherein the ceramic is selected from the group consisting of alumina, boron nitride, and combinations thereof.

7. The dual mode thruster nozzle system for propelling a spacecraft of claim 4 wherein the combustion chamber is made of polymer sheets made from fluoridated hydrocarbons.

8. The dual mode thruster nozzle system for propelling a spacecraft of claim 4 wherein the liquid propellant is selected from the group consisting of AF-M315E, LMP-103S, hydrazine, and combinations thereof.

9. The dual mode thruster nozzle system for propelling a spacecraft of claim 4 wherein the fluid flow motivator is selected from the group comprising a pump and a pressure source.

10. The dual mode thruster nozzle system for propelling a spacecraft of claim 4 wherein the power source operationally connected to the pair of separated electrodes is the same power source operationally connected to the trigger electrode.

11. The dual mode thruster nozzle system for propelling a spacecraft of claim 4 wherein the liquid propellant reservoir in fluidic communication with the ignition space and the liquid propellant reservoir in fluidic communication with the combustion chamber are unitary.

12. The dual mode thruster nozzle system for propelling a spacecraft of claim 11 wherein the liquid propellant reservoir is connected in fluidic communication with the ignition space and with the combustion chamber are unitary through a single conduit.

13. A dual mode engine for propelling a spacecraft, comprising:
   a combustion chamber having a flange end, an open nozzle end, and an enclosed chamber portion extending therebetween;
   a propellant tank in fluidic communication with the combustion chamber;
   an electronic controller;
   a power source operationally connected to the electronic controller;
   a fluid flow motivator operationally connected to the electronic controller and connected in fluidic communication with the propellant tank;
   a chemical propulsion portion further comprising:
      a propellant inlet port operationally connected to the combustion chamber and disposed adjacent the flange end;
      an ignition trigger electrode positioned in the combustion chamber adjacent the propellant inlet port and operationally connected to the electronic controller and operationally connected to the power source;
      wherein the propellant inlet port is fluidically connected to the propellant tank;
   an electric propulsion portion, further comprising:
      at least two spaced electrodes for ionizing the propellant positioned in the combustion chamber adjacent the nozzle end;
      a plurality of attitude control thrusters operationally connected to the electronic controller and in fluidic communication with the propellant tank; and
      a plurality of respective valves, each respective valve fluidically connected between a respective attitude control thruster and the propellant tank;
      wherein the propellant inlet port is fluidically connected to the propellant tank.

14. The dual mode thruster nozzle system for propelling a spacecraft of claim 13 wherein the fluid flow motivator is selected from the group comprising a pump and a pressure source.

15. The dual mode thruster nozzle system for propelling a spacecraft of claim 13 wherein the nozzle is a ceramic.

16. The dual mode thruster nozzle system for propelling a spacecraft of claim 15 wherein the ceramic is selected from the group consisting of alumina, boron nitride, and combinations thereof.

17. The dual mode thruster nozzle system for propelling a spacecraft of claim 13 wherein the combustion chamber is made of polymer sheets made from fluoridated hydrocarbons.

18. The dual mode thruster nozzle system for propelling a spacecraft of claim 13 wherein the liquid propellant is selected from the group consisting of AF-M315E, LMP-103S, hydrazine, and combinations thereof.

\* \* \* \* \*